Dec. 8, 1959   A. J. LA TORRE   2,915,934
BLIND FASTENER WITH EXPANSIBLE COLLAR
AND THREAD LOCK MEANS
Filed April 29, 1957

INVENTOR.
ALBERT J. LATORRE
BY Lynn H. Latta
-ATTORNEY-

United States Patent Office 2,915,934
Patented Dec. 8, 1959

2,915,934

BLIND FASTENER WITH EXPANSIBLE COLLAR AND THREAD LOCK MEANS

Albert J. La Torre, Torrance, Calif.

Application April 29, 1957, Serial No. 655,571

2 Claims. (Cl. 85—2.4)

This invention relates to fasteners of the type commonly referred to as "blind" bolts, characterized generally by the provision of bolt and nut elements having driving or wrenching surfaces disposed at one end (the outer end) of the fastener, and including an opposite (blind) end portion which is adapted to be passed freely through openings in plates or sheets to be secured together and which embodies head forming means adapted to be expanded by operation of the one end of the fastener, whereby the fastener may be driven without the necessity for applying tools to both ends thereof.

In general, the object of the invention is to provide a nut and bolt combination including a nut and bolt element having wrenching means at the same end of the fastener, adapted to be simultaneously engaged by a nut running tool, the opposite end of the fastener having means for forming a head in opposed relation to the nut, as the result of a relatively rotating threading action between the nut and bolt.

More specifically, the invention contemplates a blind fastener having wrenching means at one end and having an opposite end portion including a head forming device adapted to pass through the apertures to be filled by the fastener in fastening plates or sheet members together, said head forming means comprising a collar that is adapted to be expanded by stretching it over a mandrel, and which has its one end drawn tightly against the work at the end of such expansion step.

The invention deals particularly with the problem of locking the fastener when it has been set up tightly against the work. This problem has been a difficult one in blind fasteners hereinbefore developed, and it has hitherto been considered necessary to employ an integral sleeve on the nut, extending through the work and co-operating with a locking shoulder or the like on the bolt to effect the locking action. The present invention eliminates the necessity for this type of construction and provides a simpler device, which can be fabricated entirely by automatic lathe or screw machine, thereby greatly reducing the cost of manufacture thereof as compared to the prior bolt and nut type blind fasteners.

A further object is to provide a blind fastener which eliminates those threads which, in prior fasteners of the type indicated, occur in the sleeve portion of the fastener and may occur in the shear plane of the fastened assembly.

More specifically, the invention contemplates a blind fastener embodying a bolt having a driving shoulder at its blind end, an expansible collar arranged to be driven by said shoulder as the bolt is drawn through the work; a sleeve having at one end a conical mandrel adapted to enter and expand the collar into a head for engaging the blind side of the work; and a nut threaded onto the opposite end of the bolt, the sleeve being adapted to project through the work and to engage the nut in a manner to form a thread lock therein as the fastener is set up tightly at the end of a driving operation.

Other objects and advantages will become apparent in the ensuing specification and appended drawing in which.

Figure 1:
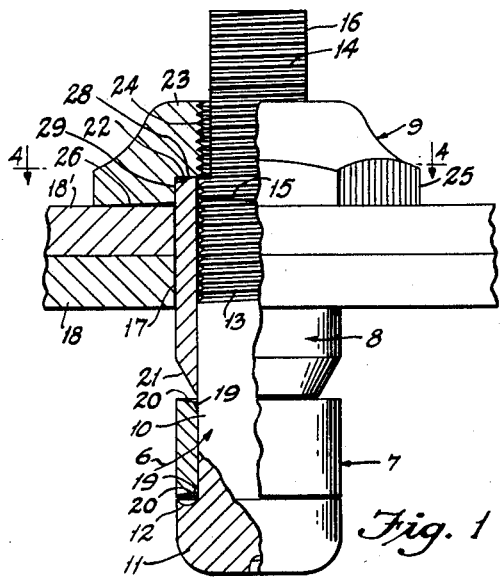
Fig. 1 is a view, partially in side elevation and partially in axial section, of a blind fastener embodying the invention, with the parts shown in an early stage of attachment.

Referring now to the drawings in detail, I have shown in Fig. 1 thereof as an example of one form in which the invention may be embodied, a blind fastener which, in general, includes a bolt 6, an expansible head forming collar 7, a mandrel sleeve 8, and a nut 9.

The bolt 6 includes a cylindrical shank 10, a small head 11 at its blind end, the head 11 defining a driving shoulder 12, a full threaded intermediate section 13, and a break off section 14 at its opposite end, joined to the full threaded section 13 by a weakened junction 15 which is defined by an annular groove in the bolt, extending below the minimum thread diameter. Break off tip 14 has parallel opposite flat sides 16 where its threads have been removed, and has intervening sides provided with thread segments as indicated. The flat sides 16 provide wrenching surfaces for interlocking with the jaws of a nut running tool into which the tip 14 is inserted in the driving operation. Such a tool may be of the type disclosed in the copending application of Joseph LaTorre Serial No. 479,449 filed January 3, 1956, and accordingly is not illustrated herein.

The annular groove which defines the junction 15 is machined into the bolt shank before threading thereof, with a tool having a relatively sharp taper (of approximately 30°) such that the groove is relatively deep and narrow. Consequently, in the ensuing threading operation (executed by thread rolling), the metal on either side of this groove is moved axially to shift the walls of the groove toward one another into substantially full contact, and the groove becomes substantially invisible in the finished bolt. This provides a very definite improvement in that the thread extends across the groove without any substantial break therein, the slanting walls of the thread being substantially continuous on both sides of the groove. This improves the grip of the nut threads against the bolt as the weakened section of the bolt is drawn through the nut, and is especially important in connection with the nut of this invention which is provided with a minimum number of threads consistent with adequate driving power.

The head 11 has a cylindrical lateral wall which is just slightly smaller in diameter than the walls of the openings 17 which are bored in the work sheets or plates 18, 18' which are to be secured together by the fastener. The collar 7 is cylindrical, having a cylindrical inner wall just a trifle larger in diameter than the wall of cylindrical shank 10, and having a cylindrical outer wall of the same diameter as the outer wall of head 11. At its respective ends, collar 7 has internal countersunk chamfers 19, joining its inner walls, and its end walls 20 are slightly conical, tapering in inwardly converging relation. Collar 7 is of any malleable or ductile material which can be stretched to the point where its radius is increased by its wall thickness or more. Aluminum alloy, mild steel, brass, stainless steel, titanium, etc. may be utilized.

Figure 2:
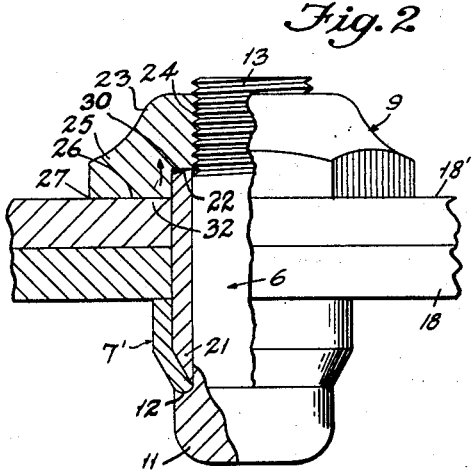
Fig. 2 is a view similarly in elevation and section, showing the fastener fully driven.
Figure 3:
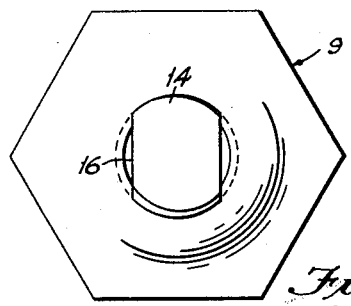
Fig. 3 is an end view at the driving end of the fastener.
Figure 4:
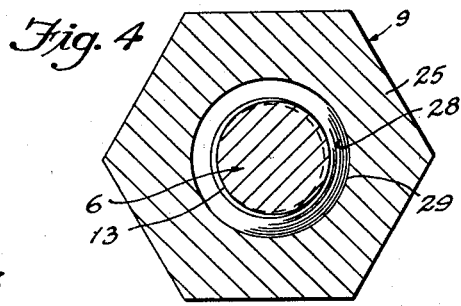
Fig. 4 is a transverse sectional view taken on line 4—4 of Fig. 1.

Mandrel sleeve 8 is of a length to extend from driving shoulder 12 to approximately the beginning of the threaded section joining shank 10, i.e. to approximately the same length as shank 10. It is of hardened steel or other equivalent material, having a hardness considerably greater than that of the bolt 6. Its outer diameter is substantially the same as that of head 11 and the original outer diameter of collar 7. The sleeve 8 has a number of functions. It functions to fill the openings 17 in the work and to provide a hard, unyieldable shear load bearing surface to resist the shear between the work parts 18, 18'. At the blind end of the fastener, it is provided with a conical mandrel tip 21 which is adapted to pilot in the adjoining countersink 19 of collar 7, for initial entry into the collar, and to then be driven into the collar so as to expand the same into a head 7' as shown in Fig. 2, with the near end of the head 7' bearing tightly against the inner work sheet 18 and the outer end seated tightly in the annular recess defined by driving shoulder 12.

Driving shoulder 12 is disposed generally in a plane normal to the axis of shank 10 but instead of being flat it is channeled with a toroidal curvature providing an annular recess which crowds the adjoining end of collar 7 inwardly against the shank 10 and inhibits any tendency of said adjoining end of the collar to expand outwardly and escape past the driving shoulder 12.

At its opposite end, mandrel sleeve 8 has a relatively flat frusto-conical bearing face 22 defining an apex bearing edge at the inner wall of the sleeve. The purpose of this conical bearing face will be explained hereinafter.

The nut 9 includes a crown portion 23 having an internal thread 24 defining a threaded bore to receive the threaded portion of the bolt; and includes a skirt portion 25 having a shallowly recessed, nearly flat, conical face 26 terminating at the periphery of the nut in a bearing edge 27 which initially engages the outer work sheet 18'. As the nut is drawn tight on the bolt, increasing the end loading thereof, the skirt section 25 will deflect with a belleville washer type of deflection in which the bearing face 26 is flattened into full contact with the work sheet 18'. Thus the nut is spring loaded into frictional engagement with the work to resist rotation and assist in locking the nut against loosening on the bolt.

Defined within the skirt section 25 is a counterbore 28, of rectangular section defining a cylindrical bearing wall 29 of a diameter the same as that of the holes 17 in the work, and defining a flat end shoulder 30 against which the bearing edge of end face 22 of mandrel sleeve 8 is adapted to bear. The outer end portion of mandrel sleeve 8 is snugly received in the counterbore 28 and has supporting engagement with the cylindrical wall 29 to provide, in effect, a trunnion upon which the nut may be rotated, relieving the bolt threads of lateral loading from the nut. To be more specific, the end of the sleeve 8 is piloted in the counterbore 28 so as to establish an accurately coaxial relation between the nut and the sleeve, and in turn, the shank 10 of the bolt is piloted within the sleeve 8 so as to provide coaxiality between the bolt and the sleeve. Thus, the sleeve, interposed between the bolt and the nut, functions as a centering and bearing member to maintain the bolt and nut in coaxial relation during the driving operation.

Figure 5:
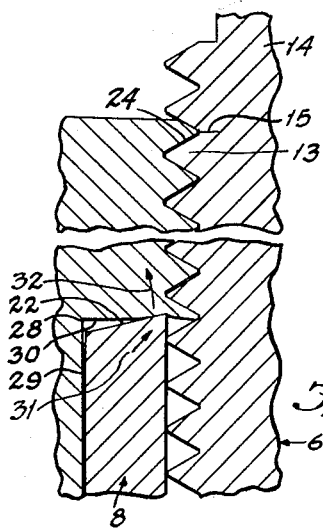
Fig. 5 is an enlarged detail fragmentary sectional view of the bolt in the locking area thereof.

The bearing edge of end face 22 of sleeve 8 bears against the shoulder 30 at the base diameter of female thread 24, and functions to deform the thread inwardly to provide a thread lock at the inner extremity of the thread 24, adapted to grip the bolt thread to resist unthreading movement between the nut and bolt. As the nut is drawn tightly, with a steep rise in the end loading between the end face 22 and the shoulder 30, the pressure exerted by the bearing edge of the end face 22 will be directed diagonally (as indicated by arrow 31 of Fig. 5) as a composite of the axial pressure in sleeve 8 and a radially inward component thereof which results from the fact that pressure is concentrated at the thread diameter and that the resistance of shoulder 30 to deformation is much lower at the radius of thread 24 than in the solid region of crown 23 radially outwardly thereof. Thus the metal of crown 23 tends to move in the direction of least resistance, and the bevelled end face 22 of the sleeve tends to curl inwardly, to follow the inwardly deforming movement of the shoulder 30, due to the taper of the end face of the sleeve.

The deforming action at the inner extremity of thread 24 is increased in the following manner: as the skirt 25 undergoes flattening deflection, the counterbore 28 and inner end portion of nut thread 24 are initially expanded to increased diameter while the outer end portion of thread 24 tends to contract, the entire cross section of the nut rotating slightly about an annular axis in the mid-portion of said cross section, with typical belleville action. Due to the increase in diameter of the inner extremity of nut thread 24, a slightly increased tolerance gap between this portion of the nut thread and the bolt thread is developed to make room for a greater degree of radially inward deformation of thread 24 than would otherwise be possible. The deformation continues after the expansion of the inner portion of the thread has taken place, and proceeds to the point where the thread 24 is tightly wedged against the threaded section 13 of the bolt. The nut is of a material sufficiently soft so that permanent deformation will take place. Accordingly, any tendency of the nut to rotate in the unthreading direction will correspondingly relax the belleville deflection in the bearing face 26, allowing a corresponding increment of shrinkage of the inner end of nut thread 24 which draws it even more tightly against the bolt thread 13, as indicated by arrow 32 in Fig. 2, thus increasing the grip of the thread lock.

This locking action has been verified by actual tests upon samples of the invention that have been reduced to practice, such tests revealing that, upon the application of sufficient torque in the unthreading direction to start rotation of the nut, the amount of torque required for further rotating the nut in the unthreading direction will actually increase in a portion of the unthreading movement.

The effectiveness of the thread lock is greatly increased by the continuing action of bearing face 22 of sleeve 8, which goes into compression in the tightening of the fastener, and which therefore exerts continuing deforming pressure against the inner portion of thread 24 as indicated by arrow 31, preventing any expansion of the nut thread toward its original diameter through wedging action of the bolt thread against the nut thread, especially under conditions of vibration tending to produce cold flow or fretting action between the threads. On the contrary, any cold flow relaxing or contraction of the work thickness under the belleville spring pressure, vibration etc., will result in setting the thread lock tighter as indicated by arrow 32 through the relaxation of deflection described above, which is the reverse of the expanding deflection that takes place in the belleville deflection of the nut in the original setting operation.

An important function of the end portion of sleeve 8 which projects into the counterbore 28, is that of taking the shear loads and other radial loads acting between the bolt thread 13 and the work member 18', and between the nut and bolt. It supports the bolt against bending, in an area outside the area of the thickness of the work. It provides a bearing pilot for the nut beyond the shear plane. Conversely, the nut contains and supports the projecting sleeve end for accurately centered deforming pressure against the nut thread.

The sleeve is somewhat harder than the nut in order to inhibit deformation of the sleeve and to develop maximum deformation in the nut.

Figure 6:
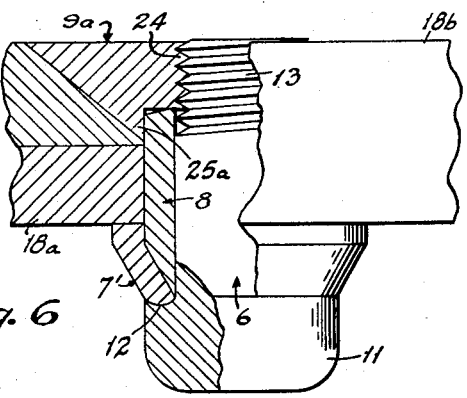
Fig. 6 is a view of a modified form of the invention, partially in section and partially in elevation.

In the form of the invention shown in Fig. 6, which provides a flush finish at the outer face of the work, the nut 9a has a frusto conical skirt portion 25a that traverses the shear plane between work sheets 18a and 18b, relieves the bolt and the sleeve 8a of shear loading, and provides for the counterbore 28 therewithin. Sleeve 8a and bolt 6a are somewhat shorter than corresponding parts 8 and 6.

I claim:

1. In a blind fastener, operable from one side of a pair of work members to be secured together, having a pair of registering openings to receive the fastener, in combination: a bolt including a shank, a head integral with one end of said shank and defining an annular driving shoulder facing the shank, and a threaded section on the other end of the shank; a nut including a crown portion having a bore provided with a female thread mating with said threaded section and a work engaging skirt portion defining a counterbore communicating with the inner end of said bore, said counterbore having a cylindrical lateral wall and a substantially radial abutment shoulder; a sleeve encircling said bolt shank and threaded section and having an outer end portion extending into said counterbore, said sleeve having at its opposite end a conical expander mandrel; and a tubular collar encircling said shank between said mandrel and said driving shoulder, said collar and sleeve being of relatively soft and hard materials respectively, said head, collar and sleeve having substantially equal outer diameters slightly smaller than the diameter of said openings, for insertion therethrough with said skirt establishing bearing engagement with the outer work member in such insertion, and said bolt being operable, upon threading advancement thereof in the nut, to effect driving engagement of said driving shoulder against one end of said collar, to drive the other end of the collar over said mandrel and into engagement with the inner work member, thereby expanding said collar into a clamping head cooperable with said nut to clamp the work between them, said outer end portion of the sleeve having an end face of frusto-conical form, tapering inwardly toward said abutment shoulder and terminating at the inner diameter of the sleeve with a swaging lip of acute-angle section adapted to apply compressive forces to said abutment shoulder, concentrated at the inner margin of said abutment shoulder adjacent and outwardly of the root diameter of said female thread for deforming the latter radially inwardly into thread-locking engagement with said threaded section of the bolt when said clamping head and nut are drawn tightly against the work members, said skirt portion of the nut having a shallow frusto-conical work-engaging face adapted when drawn tightly against the work to flatten with a belleville washer deflection resulting in the expansion of said nut bore adjacent said abutment shoulder so as to provide enlarged clearance for radially inward deformation of said female thread, whereby, upon relaxing said belleville deflection, the deformed portion of said female thread will shrink into tighter engagement with said threaded section of the bolt.

2. In a blind fastener, operable from one side of a pair of work members to be secured together, having a pair of registering openings to receive the fastener, in combination: a bolt including a shank, a head integral with one end of said shank and defining an annular driving shoulder facing the shank, and a threaded section on the other end of the shank; a nut including a crown portion having a bore provided with a female thread mating with said threaded section and a skirt portion for engagement with the work, said skirt portion defining a counterbore communicating with the inner end of said bore, said counterbore having a cylindrical lateral wall and a substantially radial abutment shoulder; a sleeve encircling said bolt shank and threaded section and having an outer end portion extending into said counterbore, said sleeve having at its opposite end a conical expander mandrel; and a tubular collar encircling said shank between said mandrel and said driving shoulder, said collar and sleeve being of relatively soft and hard materials respectively, said head, collar and sleeve having substantially equal outer diameters slightly smaller than the diameter of said openings, for insertion therethrough with said skirt establishing bearing engagement with the outer work member in such insertion, and said bolt being operable, upon threading advancement thereof in the nut, to effect driving engagement of said driving shoulder against one end of said collar, to drive the other end of the collar over said mandrel and into engagement with the inner work member, thereby expanding said collar into a clamping head cooperable with said nut to clamp the work between them, said outer end portion of the sleeve terminating in a swaging lip that is compressively engageable with said abutment shoulder adjacent and outwardly of the root diameter of said female thread for deforming the latter radially inwardly into thread-locking engagement with said threaded section of the bolt when said clamping head and nut are drawn tightly against the work members; said skirt portion of the nut having a shallow frusto conical work engaging face adapted when drawn tightly against the work to flatten with a belleville washer deflection resulting in the expansion of said nut bore adjacent said abutment shoulder so as to provide enlarged clearance for radially inward deformation of said female thread, whereby, upon relaxing said belleville deflection, the deformed portion of said female thread will shrink into tighter engagement with said threaded section of the bolt.

References Cited in the file of this patent

UNITED STATES PATENTS

| | | |
|---|---|---|
| 340,308 | Harvey | Apr. 20, 1886 |
| 2,099,678 | Curtis | Nov. 23, 1937 |
| 2,407,741 | Goodby | Sept. 17, 1946 |
| 2,546,332 | Costello | Mar. 27, 1951 |
| 2,632,354 | Black | Mar. 24, 1953 |
| 2,788,830 | Rosan | Apr. 16, 1957 |

FOREIGN PATENTS

| | | |
|---|---|---|
| 270,357 | Great Britain | May 4, 1927 |